Dec. 15, 1964 R. W. ALLRED ETAL 3,161,374

VERTICAL LIFT AIRCRAFT

Filed Oct. 22, 1962 6 Sheets-Sheet 1

INVENTORS.
ROBERT W. ALLRED
FREDERICK W. CLAYTON
THEODORE W. SCHMIDT

BY Reynolds & Christensen
ATTORNEYS

INVENTORS.
ROBERT W. ALLRED
FREDERICK W. CLAYTON
THEODORE W. SCHMIDT
BY
Reynolds + Christensen
ATTORNEYS Dec. 15, 1964 R. W. ALLRED ETAL 3,161,374

VERTICAL LIFT AIRCRAFT

Filed Oct. 22, 1962 6 Sheets-Sheet 3

INVENTORS.
ROBERT W. ALLRED
FREDERICK W. CLAYTON
THEODORE W. SCHMIDT
BY
Reynolds & Christensen
ATTORNEYS INVENTORS.
ROBERT W. ALLRED
FREDERICK W. CLAYTON
THEODORE W. SCHMIDT
BY
Reynolds + Christensen
ATTORNEYS Dec. 15, 1964 R. W. ALLRED ETAL 3,161,374

VERTICAL LIFT AIRCRAFT

Filed Oct. 22, 1962 6 Sheets-Sheet 5

INVENTORS.
ROBERT W. ALLRED
FREDERICK W. CLAYTON
THEODORE W. SCHMIDT

BY Reynolds & Christensen
ATTORNEYS

Dec. 15, 1964 R. W. ALLRED ETAL 3,161,374

VERTICAL LIFT AIRCRAFT

Filed Oct. 22, 1962 6 Sheets-Sheet 6

INVENTORS.
ROBERT W. ALLRED
FREDERICK W. CLAYTON
THEODORE W. SCHMIDT
BY
Reynolds + Christensen
ATTORNEYS United States Patent Office 3,161,374

Patented Dec. 15, 1964

3,161,374

VERTICAL LIFT AIRCRAFT

Robert W. Allred, Bellevue, Frederick W. Clayton, Maple Valley, and Theodore W. Schmidt, Seattle, Wash., assignors to The Boeing Company, Seattle, Wash., a corporation of Delaware Filed Oct. 22, 1962, Ser. No. 232,062

10 Claims. (Cl. 244—12)

This invention concerns an aircraft which during normal flight is propelled forwardly by propulsive or cruise engines, preferably of the jet type, to develop aerodynamic lift in the normal way, and takes off and lands in forward flight attitude, but substantially vertically, while sustained by vertical lift means, preferably ducted fans rotative about vertical axes, powered normally by other jet engines which effect rotation of the fans. Aircraft of the type thus broadly described are known, but the present invention deals with certain relationships between the propulsive engines and the vertical lift engines; the relation of both to the sustaining wing of the aircraft; the means to control and effect transition from vertical to forward flight, and the reverse; the means to control pitch and roll through differential or selective control of the principal vertical lift means; the cooperation of the propulsive jet engines and the vertical lift jet engines in the event one or the other fails; and the general design of an aircraft which has such propulsive engines and vertical lift means, including the disposition of the several vertical lift means with relation to what may be termed the intersection of the quarter-chord line and the longitudinal center line of the aircraft, where the center of aerodynamic lift of the sustaining wing as a whole is located, to produce a vertical lift centered at and balanced about the aerodynamic center of lift, and in one design including the arrangement to minimize vibration and ducting, and to provide a maximum of fuel space, and further including cover means which in aerodynamic flight constitute an integral part of the cambered airfoil, but which can be raised during vertical lift and the initial stages of forward flight to induce air flow into the vertical lift means.

Thus, in regard to the relationship between the propulsive engines and the vertcial lift engines, and in conjunction with a design employing four fans and an engine to drive each of them, and employing two propulsive engines, it is an object of this invention, in a preferred design, to arrange two fan-driving engines and one propulsive engines and the vertical lift engines, and in conjunction of the aircraft's longitudinal center line, whereby all ducting, controls, fuel lines, sources of vibration, etc., are concentrated at each of two places on the wing. Thereby the general design becomes one with minimum ducting, all hot exhaust ducting is removed from proximity to the fuselage, and all space intermediate the stacks of engines at the opposite sides is available as fuel space, as well as the wing tip spaces.

The general design contemplates the use of a sustaining wing having a root section of materially greater chord than the wing tip sections, the leading edge of the root section being offset ahead of the leading edge of the wing tip sections and preferably disposed perpendicularly to the aircraft's longitudinal center line; the leading edge of the wing tip sections may be swept back. Such a configuration, assuming separation of airflow over the respective wing sections, will have an aerodynamic center of lift of the root section forwardly of the like center of lift of the wing tip sections, and a combined center of aerodynamic lift of the wing as a whole at an intermediate point, along the longitudinal center line. The use of nacelles upstanding from and projecting below the wing's skin, at the junction between the root section and the wing tip sections (within which nacelles one or more engines may be located), assures separation of airflow over the respective sections. The center of vertical lift can now be located to coincide substantially with the center of aerodynamic lift, by suitable disposition of the vertical lift fans or equivalent devices in the wing—usually within the root section—balanced about the center of aerodynamic lift. This will achieve stability during change-over from vertical lift to forward flight, or the reverse. Thereby simple change-over control means will suffice, and will not be unduly critical as to expertness of manipulation.

Using four vertical-lift fans, two symmetrically disposed at each side of the longitudinal center line, and two disposed ahead of the center of lift, symmetrically with respect to two disposed behind the center of lift, enables control of roll and of pitch, respectively, by differential control of the opposite fans, with or without other roll or pitch controls, which is a further object of the invention.

Any jet engine may flame-out or otherwise fail, and since there are six jet engines in all, four for driving the four vertical lift fans and two or more for forward propulsion, it is an object of this invention, in one design shown, to enable prompt substitution of one or other fan-driving engine for a propulsive engine, or alternatively the substitution of a propulsive engine for either or both of the fan-driving engines at the same side, in the event of engine failure.

It is also an object to provide for access of air to the fans and for control of the delivery of air from the same, in a simple manner, capable of gradual transition from vertical lift to forward flight, or the reverse.

Still a further object, in one embodiment of the invention, is to concentrate all engines, which are the sources of noise and vibration, outboard upon the wing, and well away from the fuselage, which is thereby affected in minimum degree.

Another object is to design the portion of the wing wherein the fans are located in such manner that its upper surface can be made unbroken and continuous during aerodynamic flight, but a cover which is a part thereof can be raised during vertical lift to afford access of air to the fans.

Other objects will appear as this specification progresses, especially such as pertain to mechanisms and the like.

In the accompanying drawing the invention is shown in several embodiments, most of which achieve all the objects stated above.

Referring to FIGURES 1, 10, 13, and 17, in particular, the aircraft includes a wing the root section 1 whereof lies symmetrically at opposite sides of the longitudinal center line of plane C, and is of materially greater chord length than opposite wing tip sections 10R and 10L. The trailing edges of the three wing sections may be aligned, but the leading edge of the root section lies well ahead of the leading edge of the wing tip sections. The leading edge of root section 1 may be perpendicular to center line C, but preferably the leading edges of the wing tip sections are swept back. The fuselage 11 is extended along or is arranged symmetrically with respect to the longitudinal center line C.

Figure 1:
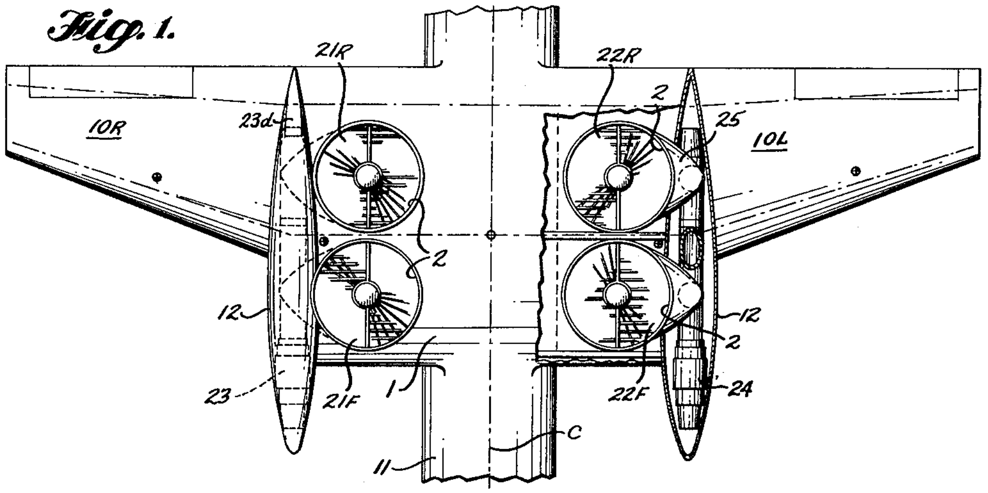
FIGURE 1 is a plan view of an aircraft which incorporates the principles of this invention, with parts broken away.
Figure 2:
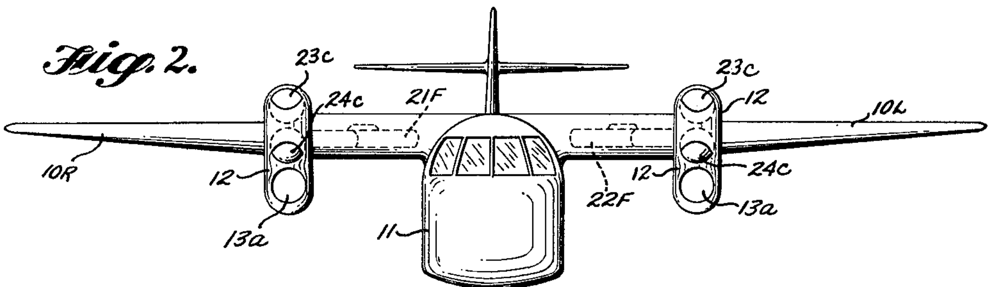
FIGURE 2 is a front elevation of the same aircraft.
Figure 3:
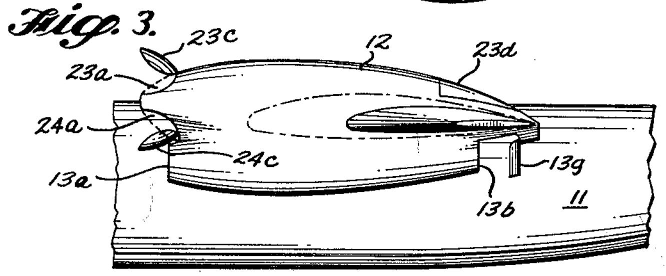
FIGURE 3 is a side elevation of the same aircraft, looking inboard from the port wing tip.
Figure 4:
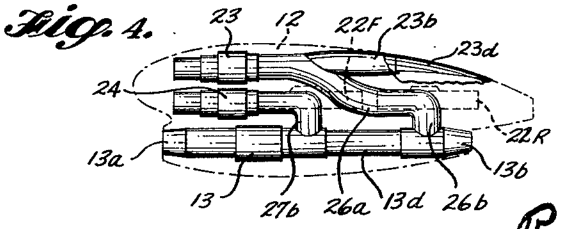
FIGURE 4 is a side elevation of the ducting interconnecting the three engines at one side, the nacelle being shown in shadow view.

At the junction between the root section 1 and each wing tip section a nacelle, such as that at 12, is supported, to house in one or more jet engines, and to serve as anti-spill means for airflow over the different sections of the wing, particularly that over the root section 1. The nacelle 12 extends above the upper wing skin and below the lower wing skin, and from a nose ahead of the leading edge of root section 1 to a streamlined tail located no farther forward than substantially at the wing's trailing edge; see FIGURES 1 and 2. So located and arranged it acts as a barrier to lateral spillage from one wing section to another, so that each wing section has and maintains its characteristic center of lift and pressure, independently of a different but adjoining wing section.

Vertical lift fans are preferably four in number, each driven by its individual jet engine, and all arranged in the wing root section 1. Thus the fans 21F and 21R are disposed to the right of the longitudinal center line C, the first forwardly and the second rearwardly. At the left the fans 22F and 22R are similarly disposed, symmetrically with respect to the corresponding fans 21F and 21R, respectively. All are arranged to rotate about vertical axes, discharging downwardly from enclosing ducts 2 which extend vertically through the wing.

Figure 5:
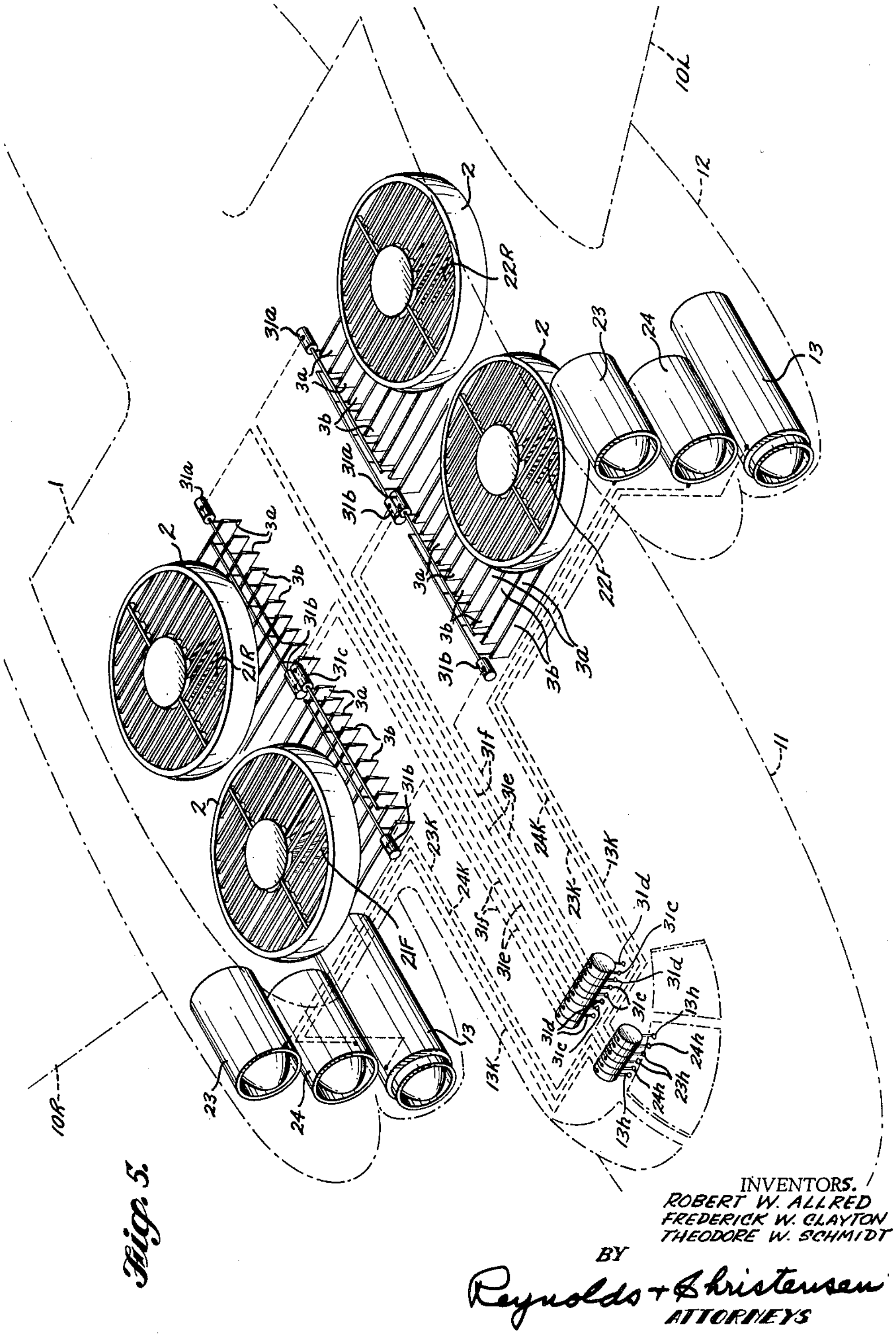
FIGURE 5 is an isometric view of the engines, fans, and control devices, ducting being omitted and the aircraft being shown shadowed, only.
Figures 6, 7, 8:
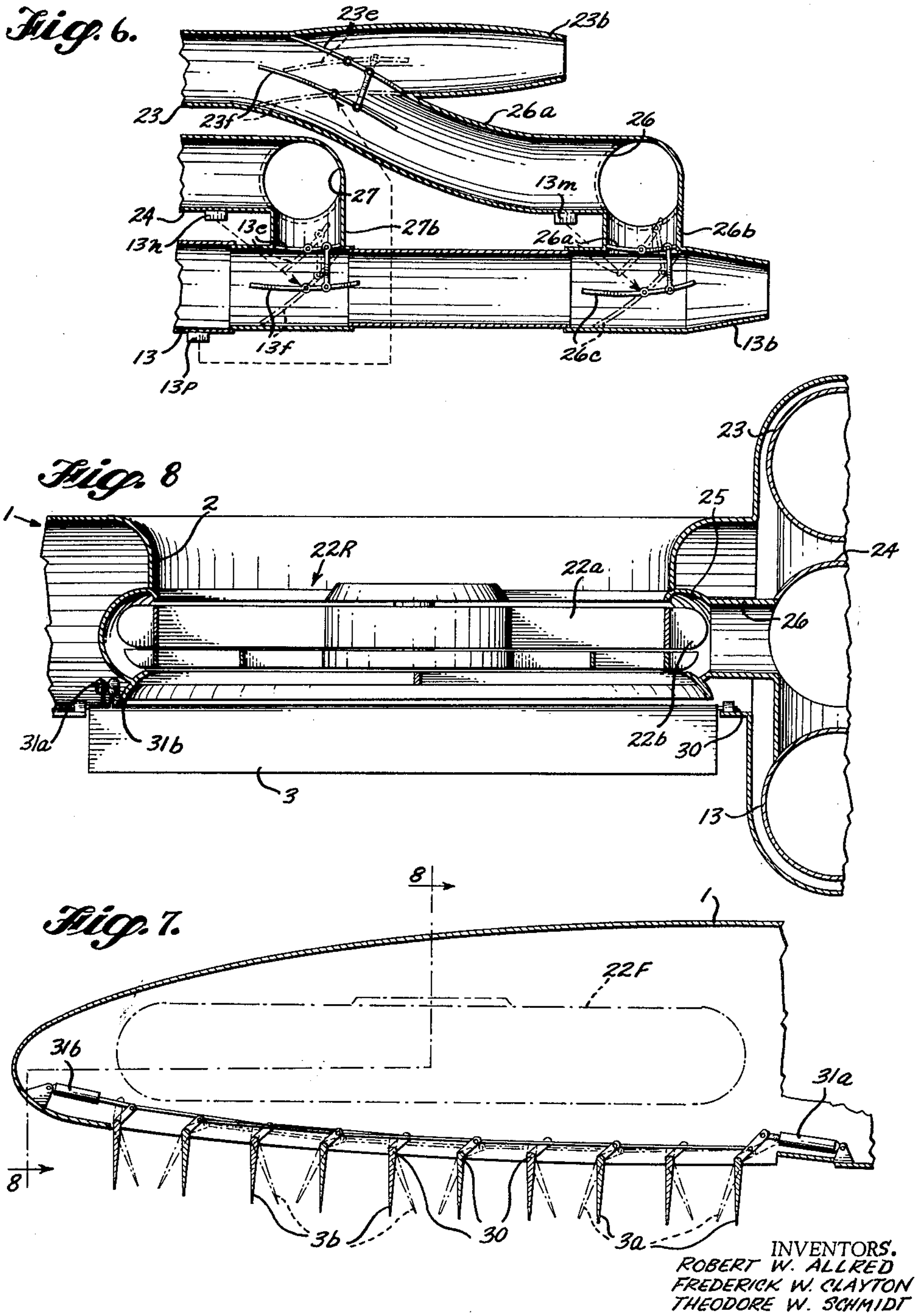
FIGURE 6 is an enlarged sectional view, at a vertical fore and aft plane, through the ducting and the controls for diverting gases from one engine gas duct to another.
FIGURE 7 is a sectional view, on a vertical fore and aft plane, of louvered controls for the discharge from a lifting fan.
FIGURE 8 is a sectional view at the line 8—8 of FIGURE 7, illustrating a part of the ducting shown in FIGURE 6.

In the arrangement shown in FIGURES 1 to 8 the six jet engines are all housed in the two symmetrically disposed nacelles 12, three engines at one side and three at the other side, and preferably are stacked vertically one above another. The required depth of the nacelle, both above and below the wing, makes of it an efficient spill barrier, as already indicated. Of the three engines the engine 13 is the normal propulsive engine, and is at all times open to the forward air intake 13*a* of the nacelle, and to the rear jet nozzle 13*b*. The normal function of engine 23 is to drive the rear fan 21R or 22R, and of engine 24 to drive the forward fan 21F or 22F. These latter engines 23 and 24 are needed for such a purpose only upon take-off or landing, or as landing is imminent, and they may be shut down at other times, or one or both may be kept idling, to be available should an emergency arise, such as failure of a propulsive engine 13. If shut down their respective air intakes 23*a* and 24*a* may be closed and streamlined by closures 23*c* and 24*c*. If left idling either their discharge will continue to rotate the fans at low speed, or it can be arranged to be discharged as forward thrust, by means described later, through rearwardly directed jet nozzles 23*b* and 13*b*, respectively. Discharge of an engine 23 or 24 through nozzle 13*b* will augment the thrust of engine 13, which discharges therethrough, and discharge through nozzle 23*b* will supplement the thrust of engine 13. Ducting and controls for diverting their discharge is shown in FIGURE 6, and will shortly be described in some detail.

The fans, of which the fan designated 22R in FIGURE 8 is typical, may include fan blades 22*a* and a surrounding series of turbine blades 22*b*, the latter enclosed within a scroll 25 to which discharge from engine 23, for instance, is led by way of duct 26. A similar duct 27 leads discharge from engine 24 to the scroll of fan 22F. While the engine 23 is driving fan 22R, the jet gases exit from the scroll 25 axially and about the circumference, mingling with and augmenting the downdraft developed by the fan. In similar manner the fan 22F is driven by engine 24, and fans 21R and 21F are similarly driven by the corresponding engines at the opposite side. The downdraft from fan 22R in its duct 2 produces an upward thrust upon the aircraft, as does the downdraft from the other fans 22F, 21R, and 21F in their respective ducts 2.

While the fans are being used to produce vertical lift the ducting and controls shown in FIGURE 6 occupy the positions shown therein in full lines. The arrangement shown is intended as suggestive only, and other forms can be substituted for the same. As shown, a closure vane 23*e* blocks discharge of gases from engine 23 to nozzle 23*b*, and diverts these gases by way of duct 26*a* to duct 26, and so to scroll 25 of fan 21R or 22R, as already described; exit to nozzle 13*b* is blocked by closure vane 26*a*. In similar fashion closure vane 13*e* blocks exit of discharge gases from engine 24 to duct 13*d* and so to nozzle 13*b*. Should engine 13 fail during forward propulsion, forward thrust may be developed from engine 23 by movement of closure vanes 23*e* and 23*f* to their dot-dash position. Vane 23*f* then blocks exit of gases from engine 23 by way of ducts 26*a* and 26, and diverts these gases to nozzle 23*b*, which now is open to engine 23 because of movement of closure vane 23*e* to its dot-dash feathered position. The discharge from nozzle 23*b* ruptures and removes the frangible cover 23*d*, or the discharge from nozzle 23*b* may be otherwise left free to produce forward thrust.

Conversely, should engine 23 fail during vertical lift, gases discharged from engine 13 can be instantly diverted to drive fan 21R or 22R, as the case may be, by movement of closure vanes 26*a* and 26*c* from their full-line to their dot-dash line position. Such movement of vanes 26*a* and 26*c* blocks exit of gases by way of nozzle 13*b*, and diverts them by way of duct 26*b* to duct 26, and so to fan 21R or 22R. Duct 26*a* can be blocked, against reverse movement of gases to the now inoperative engine 23, by shifting closure vanes 23*e* and 23*f* to their dot-dash position. Since engine 23 is inoperative, frangible closure 23*d* will not ordinarily be blown off, as it was in the situation above, wherein engine 23 was used in the production of forward thrust.

If instead of a rear fan engine 23, engine 24 for driving one of the forward fans, as 22F, should fail during vertical lift, discharge from engine 13 can be instantly diverted to this fan 22F or to the other forward fan 21F, by movement of closure vanes 13*e* and 13*f* from their full-line position of FIGURE 6 to their dot-dash line position. Vane 13*f* blocks discharge through nozzle 13*b*, and diverts it by way of duct 27*b* into duct 27. There could be a vane or vanes which correspond to those at 23*e*, 23*f*, to block reverse movement of diverted gases to engine 24, but reliance for blocking may be placed on the still spinning engine 24 itself. Again, should propulsive engine 13 fail, closure vanes 23*e* and 23*f* can be moved to their dot-dash line positions for discharge of gas from engine 23 through nozzle 23*b*, or alternatively, the closure vanes 13*e* and 13*f* can be moved oppositely to their dot-dash line position, and engine 24 will then discharge by way of duct 27*b* rearwardly into duct 13*d* and to nozzle 13*b*, the vanes 26*a* and 26*c* being then in their full-line position. In the first instance engine 23 replaces the engine 13 as the propulsive engine, and in the second instance engine 24 replaces engine 13 as the propulsive engine. Assuming the ability of engine 23 to develop adequate thrust in the first instance, or of engine 24 to develop adequate thrust in the second instance, engine 24 can replace engine 13 or engine 23 and temporarily can assume the propulsion of the aircraft through ducts 27*b*, 13*d*, and nozzle 13*b*, the nozzle 13*b* being left open by leaving the vanes 26*a* and 26*c* in the full-line position, and moving the vanes 13*e* and 13*f* to a position the reverse of their dot-dash line position of FIGURE 6, to discharge through duct 13*d* and nozzle 13*b*, supplementing the discharge from engine 23 for the time being.

By the diverting and switching means described the disastrous effect of failure of a vertical lift engine at a critical time is well guarded against; also, failure of a propulsion engine is also guarded against, although such failure would not ordinarily be so critical.

Dependence for pitch control and for banking or roll, with or without conventional control means, can be placed on differential control of the four fans 21F, 21R, 22F, and 22R. This could be accomplished by throttling the fuel supply to such engines, but since fuel throttling will produce a too-greatly-delayed response, it is preferred to throttle the air downdraft from some fans, while perhaps augmenting the downdraft from others. This can be effected in various ways; it can be done by a series of vanes generally designated 3, or to distinguish them 3*a* and 3*b*, pivotally mounted to swing about axes 30 from a full-open position, shown in FIGURE 7 in full lines, to a more restrictive position, shown in dot-dash lines, or to a fully closed position wherein they close the discharge from duct 2, and constitute in effect a part of the lower skin of the wing section 1. Actuators 31*a* and 31*b* are shown for effecting movement of vanes 3*a* and 3*b*, respectively.

Figure 9:
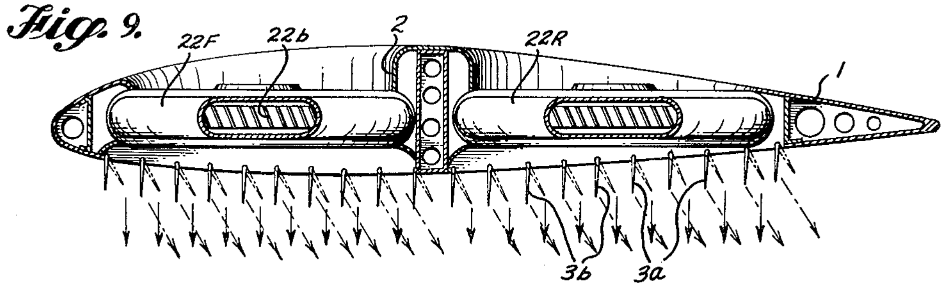
FIGURE 9 is a sectional view on a vertical longitudinal plane, through the forward and rear fans at one side of a modified form of the aircraft.
Figure 10:
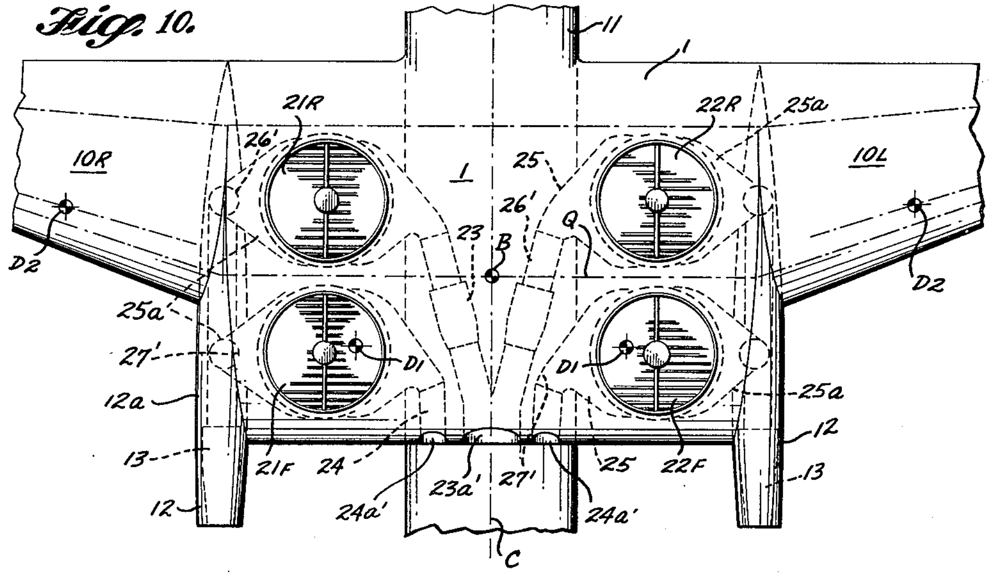
FIGURE 10 is a plan view of the modified form.

When the vanes 3*a* and 3*b* are in their fully open (full-line) position, the fan discharges directly downwardly, and produces maximum lift. When discharge is throttled by movement of the vanes into a dot-dash line position, lift is lessened, the degree depending upon the degree of throttling. Such throttling produces no forward component, but it is desirable to produce a forward thrust when the aircraft is hovering, and is about to initiate forward thrust by engine 13. This can be done by inclining all the vanes 3 rearwardly, as in dot-dash lines in FIGURE 9. This avoids the discomfort of a sudden and forceful forward thrust, but does not unduly lessen the effective vertical lift.

The upper entrance to the fan ducts 2 might be closed and faired into the wing's upper skin, during normal forward propulsion, although this is not essential. Means capable of so doing will be described shortly in connection with the description of other forms.

Figures 11, 12:
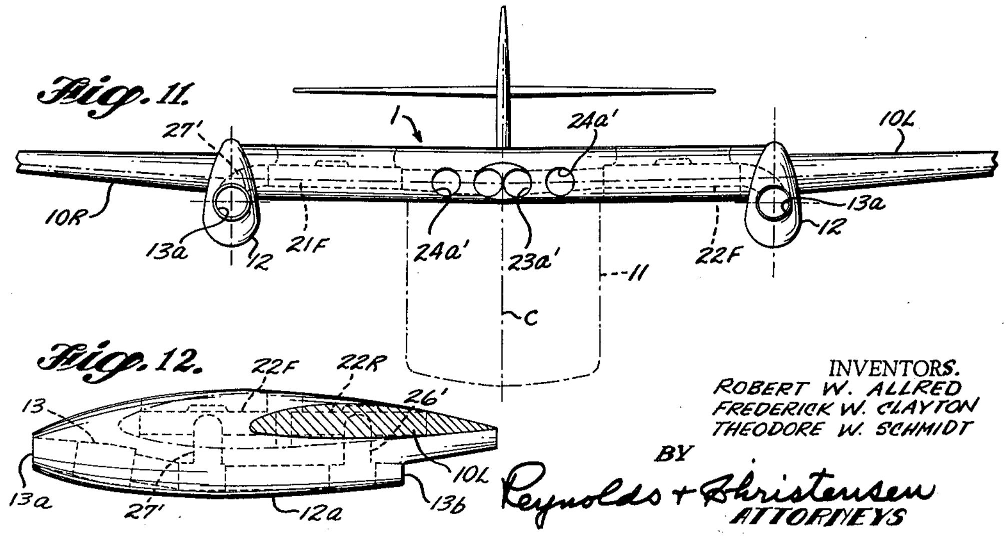
FIGURE 11 is a front elevation of the same.
FIGURE 12 is a side elevation of a nacelle of the modified form.

The form so far described has the three engines stacked in the two nacelles at the outer ends of the wing's root section 1. This removes the engines from the fuselage, and lessens the effect of their vibration and noise in the fuselage. It also eliminates much ducting, concentrating all this in the neighborhood of the engines and nacelles, and lessening the danger from hot ducts between engines and fans or nozzles. It also leaves the root section 1 largely clear of ducts, engines, and the like, and available for carriage of fuel. Certain of the engines, however, can be mounted in the root section 1, thereby lessening the frontal area of the nacelles, and are so shown in an alternative form in FIGURES 10 and 11.

In this form the propulsive engine 13 is still mounted in the nacelle 12*a*, taking in air at the intake 13*a* and discharging gas from the jet nozzle 13*b*. The nacelle is deep enough still to form an anti-spill barrier, as before. Engines 23 and 24 are mounted within the wing root section 1, and their air intakes 23*a'* and 24*a'* open, for example, in the leading edge of root section 1. Discharge of gases to scrolls 25 of the fans 21F, 21R, 22F and 22R is direct, and no provision is shown for diverting gas from any of these engines in case of failure of a propulsive engine 13. There is provision for supplying gas from engine 13 at each side to drive either fan at the corresponding side. To this end scrolls 25*a* at the fans 21R and 22R are connected by ducts 26' with engine 13 at the corresponding side, and scrolls 25*a* at the fans 21F or 22F are connected by ducts 27' with engine 13. Closure vanes similar to those shown in FIGURE 6 will control intercommunication, but have not been shown. It is, of course, necessary to maintain lift stability and control during take-off or landing, while lift is primarily produced by the four fans, but failure of a propulsive engine during forward flight still leaves the aircraft with the ability to glide until the engine can be restarted, or even the ability to sustain flight by a single engine.

The aircraft shown in FIGURES 13 to 16 locates the engines in much the same arrangement as in FIGURES 1 to 8, and the description thereof need not be repeated. This form includes a top closure 14 for the wing root section 1 and its fan ducts 2, whereby these ducts may be open during vertical lift, at which time forward propulsion is negligible, but may be closed during normal forward propulsion, to restore the proper airfoil contour to the wing root section 1, and so to increase its lift and lessen its drag. The closure 14 is mounted for tilting about its rear edge, as in FIGURE 15, and for lifting bodily to various positions, as in FIGURE 16. Its movement may be effected and controlled by any suitable mechanism such as is suggested by the jack screws 14*a* pivoted near its leading edge and extending within the fuselage 11, and the similar jack screws 14*b* pivoted near its trailing edge. A stiffening frame or truss 14*c* which is pivoted to the root section 1 and to the closure 14 near its leading edge maintains the closure against uncontrolled movement relative to the root section 1, and stiffens the latter's support by the jack screws 14*a* and 14*b*.

Figure 13:
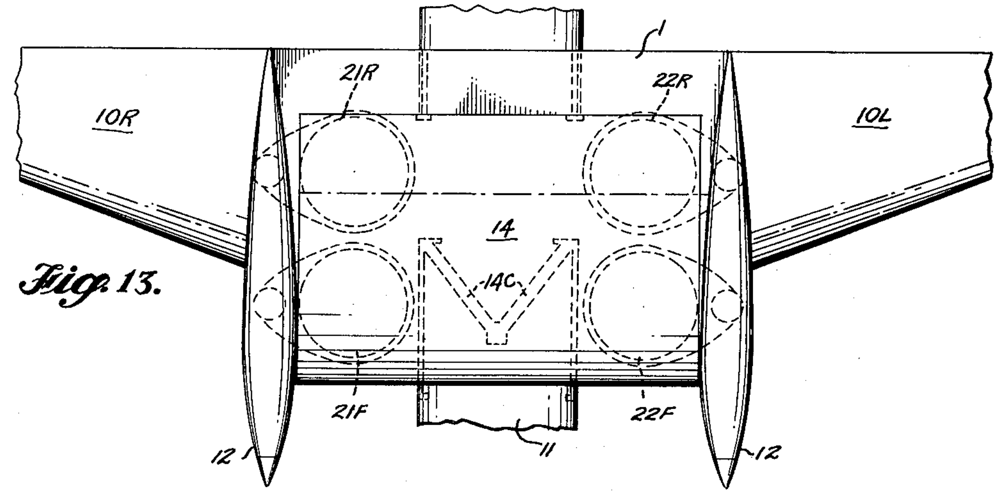
FIGURE 13 is a plan view, and FIGURE 14 a front elevation, of a further modification.
Figure 14:
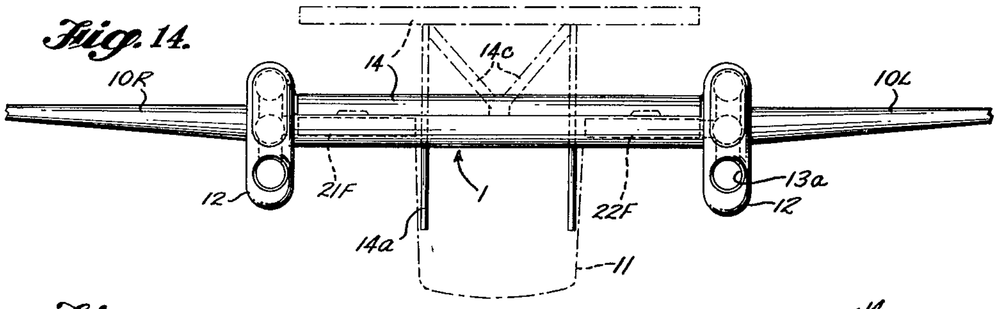
Figure 15:
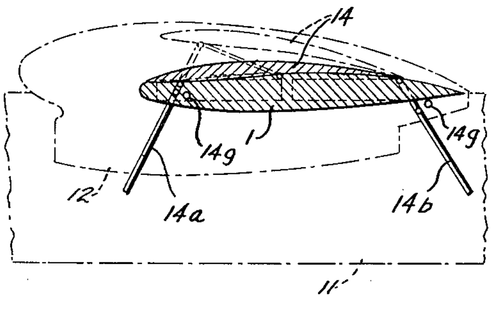
FIGURE 15 is a cross section chordwise through the root section of the wing in this modification, with parts in the forward flight position.
Figure 16:
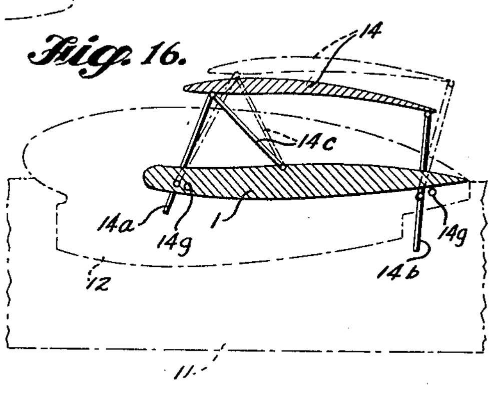
FIGURE 16 is a similar view, with parts in the position for vertical lift.
Figure 17:
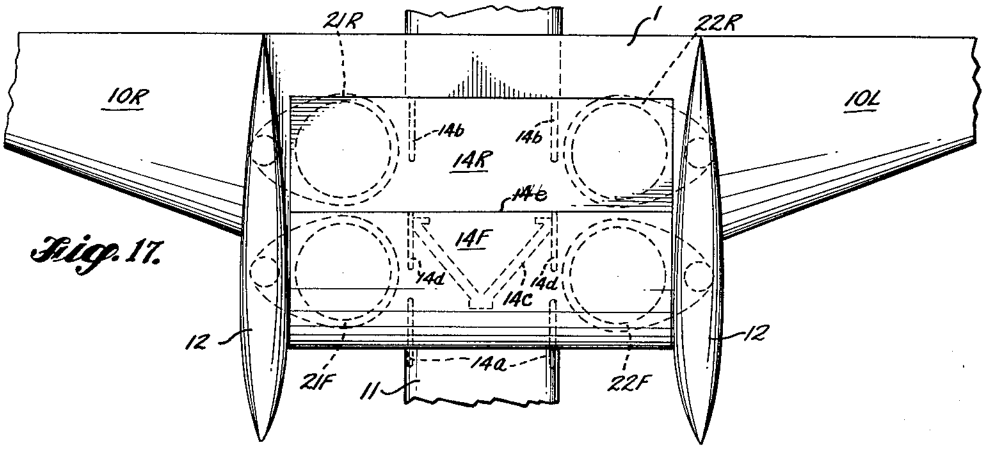
FIGURE 17 is a plan view of a still further modified form.
Figure 18:
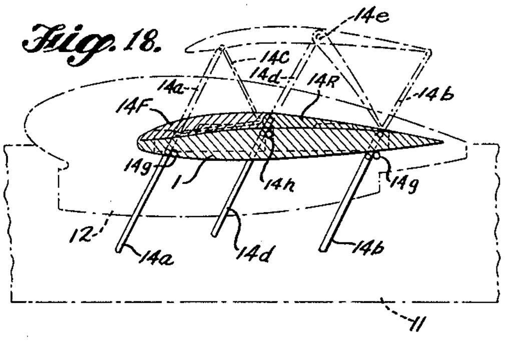
FIGURE 18 is a chordwise cross section through the root section of this latter modification, showing the parts in full lines in the forward flight position.
Figure 20:
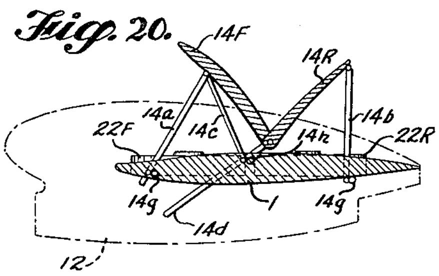
FIGURE 20 is a view similar to FIGURES 18 and 19, but with parts differently adjusted.
Figure 19:
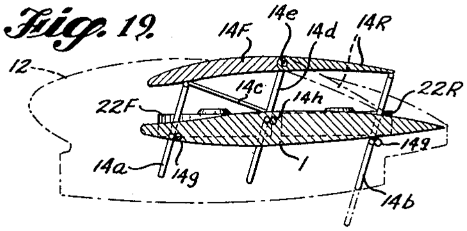
FIGURE 19 is a similar view, but with parts in the vertical lift position.
Figure 21:
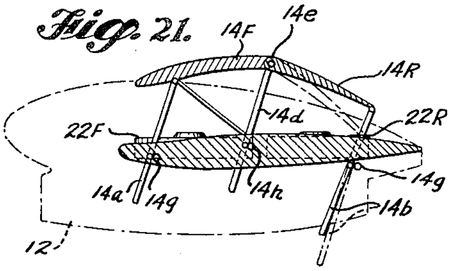
FIGURE 21 is a similar view, with parts adjusted into a still different position.

The closure 14, in the full-line position of FIGURES 13 to 15, closes off access of air to the fan ducts 2, and complements the contour of wing root section 1 to afford the best aerodynamic lift during forward flight. When the aircraft's forward progress lessens, to the point that lift from the fans is required, the closure 14 can be lifted slightly at its forward edge, as in dot-dash lines in FIGURE 15. The remaining forward speed assures an adequate ram air supply to the fans. As their lift increases and forward speed lessens, the closure 14 can be opened more fully, as is shown in FIGURE 16, and substantially all lift can be assumed by the fans. Louvers such as those at 3 can control discharge from the fans. At take-off movements would be the reverse of those just described.

A still further modification is shown in FIGURES 17 to 21. Herein the closure is divided spanwise into two pivotally interconnected portions 14F and 14R, and in addition to the actuators 14*a* and 14*b* a similar actuator 14*d* effects movement up and down of the hinge axis 14*e*. Parts which in normal forward flight are in the full-line position of FIGURE 18, to afford the best areodynamic lift characteristics during forward flight, can be moved to the dot-dash line position of that figure during vertical lift, or to an intermediate position shown in FIGURE 19. During forward flight air can be diverted into the ducts 2 by dropping the rear portion 14R, but leaving the forward portion 14F upraised, as in FIGURE 21.

In these forms, FIGURES 13 to 21, the jack screws 14*a* at the opposite sides, and the jack screws 14*b*, would be interconnected, as by the intershafting at 14*g* each for conjoint and equal raising and lowering of the leading edge of closure 14 or of closure portion 14F, and for equal raising or lowering of the trailing edge of 14 or of closure portion 14R. These leading edge actuators and the trailing edge actuators can also be interconnected, in like manner, for conjoint operation, but in such case the leading edge of closure 14 cannot be moved differentially with respect to the trailing edge thereof, as in FIGURE 15. The jack screws 14*d*, in the form of FIGURES 17 to 21, can be intershafted at 14*h*, but are best movable independently of the jack screws 14*a* and 14*b*, otherwise a movement about the hinge axis at 14*e*, as suggested in FIGURES 20 and 21, would not be possible.

Assume the aircraft to be ground-borne, and about to take off. All engines, 13, 23, and 24, at each side of the longitudinal center line C, are started. The closure vanes are in their position of FIGURE 6, so that gases from engines 23 and 24 deliver to the turbines 22*b* of their respective fans 21R and 22R, and 21F and 22F. Engine 13 delivers through the rearwardly directed propulsive nozzle 13*b*; to avoid creating forward thrust until the aircraft has lifted off the ground, a spoiler 13*g* may be lowered to intercept the rearwardly directed gases, as in FIGURE 3. Air intakes for engines 23 and 24 are also open at this time, as are the exits from the vertical fan ducts 2. Since the discharge from these engines is applied to turbines 26*b*, to spin the fans, the cover 23*d* is not impinged, and remains in place.

Now as the fans spin faster, adequate vertical lift is developed, and the aircraft, always in flight attitude, rises from the ground. Should any engine 23 or 24 falter or fail, an engine 13 can be cut in to supply the lift normally supplied by the faulty engine, and stability of the aircraft is maintained during this critical period. After the aircraft has lifted sufficiently, the vanes 3 may be inclined, as in the dot-dash position of FIGURE 9, wherein they produce a forward thrust component. At this time, in the forms of FIGURES 13 to 21, the top closure 14 or 14F and 14R would be moved towards although not fully to their closed position. The spoiler 13*g* would be raised out of the jet discharge at 13*b*. Forward flight would begin. When sufficient forward speed had been attained that the aircraft could be sustained dynamically by its airfoil (wing), all vanes 3*a*, 3*b*, and closures 14 or 14F and 14R would be closed, except to the extent needed for control, as will shortly be made clear. The engines 13 would both propel and sustain the aircraft. Nevertheless it is considered desirable to maintain the engines 23 and 24 at each side in operation, not only for possible emergency use to supply the forward thrust of a failed engine 13, but primarily for control of pitch and roll or banking of the aircraft.

It will be recognized that if the vertical lift of all four fans 21F, 21R, 22F and 22R is equal, at equal moment arms about the aircraft's center of lift or balance B (FIGURE 10), at the intersection of its longitudinal center line C and the quarter-chord line Q of the wing as a whole, the vertically moving aircraft is in balance and will remain in level flight attitude, or approximately so. If it is desired to nose it up, as forward thrust develops, a lift force developed by fans 21F and 22F, superior to the lift force of fans 21R and 22R, will accomplish this. If it is desired to bank to the left, greater downward thrust by fans 21R and 21F, than by fans 22R and 22F, will accomplish this.

The wing root section 1 is so designed that its dynamic center of lift, at D1 at either side of line C, is close to the axes of fans 21F and 22F, respectively. The wing tip sections 10R and 10L are so designed that their respective dynamic centers of lift are at D2, more or less in the line joining the axes of fans 21R and 22R, and sufficiently behind the quarter-chord line Q and the center of balance B that they balance out any pitching moment caused by fans 21F and 22F. The four fans together produce lift vertically which is balanced laterally as well as longitudinally about point B. The result is that when the fans have lifted the aircraft vertically it is in forward flight attitude, and as it moves ahead and develops aerodynamic lift there is no displacement of the center of lift or balance, except as the fans may be employed for roll and pitch control. It follows that there is no critical changeover from vertical lift to forward speed conditions or the reverse, as there may be in a normal VTOL aircraft. Moreover, in normal flight, the addition of a downward force at any fan or pair of fans will produce added lift at the corresponding side, or at the nose or tail, and appropriate change in the attitude of the aircraft relative to the point B. A similar effect could be produced by lessening the lift at any fan or fans, as by closing the passages between vanes 3*a* and 3*b*. This variation of lift can be depended upon for pitch and for roll control, or may supplement more conventional controls.

In FIGURE 5 we have attempted to suggest certain controls for operation by the pilot, to accomplish the results outlined above. Obviously these are suggestive only, and would be amplified and refined in practice. A bank of six throttles is shown, designated 23*h* for the engines 23, and connected thereto by operative connections 23*k*; 24*h* and connections 24*k* for the engines 24; and 13*h* and connections 13*k* for the engines 13. In addition controls 31*c* for actuators 31*a*, connected by an operative connection 31*e*, and controls 31*d* for actuators 31*b*, connected by an operative connection 31*f*, enable controlled operation of vanes 3*a* and 3*b* respectively. The vanes of each fan are separately controlled. Similar controls for the screw jacks 14*a*, 14*b*, and 14*d* would be supplied, but are omitted to avoid complicating the drawings. Also, like controls, terminating at switch boxes 13*m* for closure vanes 26*a*, 26*c* (FIGURE 6), 13*n* for vanes 13*e* and 13*f*, and 13*p* for vanes 23*e* and 23*f*, can effect their control in the manner already described.

By using light-weight engines to drive the fans (which are in use for only a short period at take-off or at landing), the weight of the aircraft can be kept down. The airscoop effect of the raisable cover elements 14 or 14F and 14R insures an adequate supply of air to the rear fans 21R or 22R during low speed forward flight, and the air supply can be lessened as forward speed increases, by gradually closing down these cover elements. The throttling of downward air blast by the louvers 3 enables maintenance of a substantially constant speed by the vertical lift engines 23 and 24, while the lift is being assumed by the aerodynamic effect of forward flight.

We claim as our invention:

1. An aircraft comprising a sustaining wing, propulsive jet engine means arranged to sustain the wing aerodynamically during forward flight, a plurality of vertical lift means arranged to sustain the wing by the reaction from downwardly directed air blasts, individual jet engine means arranged to drive each of said vertical lift means independently of the others, duct means interconnecting the propulsive jet engine means and the vertical lift jet engine means, and means to divert jet gas from the propulsive jet engine means to any selected vertical lift means, for emergency operation of the latter in event of failure of the corresponding vertical lift jet engine means.

2. An aircraft comprising a sustaining wing, propulsive jet engine means, including jet nozzles, mounted upon the wing and producing a forward thrust during flight, vertical lift means supported within the wing and including jet engine means operable independently of the propulsive engine means, duct means interconnecting the two engine means, and controllable means within said duct means to deflect the jet from the propulsive jet engine means to the vertical lift means, for emergency sustention, or from the latter to a jet nozzle for emergency forward propulsion.

3. An aircraft comprising a wing having a root section and wing tip sections at the opposite sides thereof, a longitudinally directed nacelle outstanding from the wing's surface at the junction between its sections, a propulsive jet engine and two vertical lift jet engines disposed at each side of the aircraft's longitudinal center line, the several jet engines at each side being stacked vertically within the nacelle at the corresponding side, two vertical lift fans in the wing at each side of the longitudinal center line, balanced laterally with the two at the opposite side, and the two at the same side being located one ahead of and balanced longitudinally with the other behind the wing's center of balance, and duct means communicating between each fan and the corresponding one of the two vertical lift jet engines at the corresponding side of the longitudinal center line, to drive such fan.

4. An aircraft as in claim 3, including additionally duct means communicating between the propulsive jet engine in the nacelle and the adjacent vertical lift fans, for emergency supply of propulsive gas to operate any fan in case of failure of its vertical lift jet engine.

5. An aircraft comprising a wing having longitudinally directed nacelles balanced at the respective sides of its longitudinal center line, a propulsive jet engine, and two vertical lift jet engines stacked vertically within each nacelle, a pair of vertical lift fans in the wing, at each side of its longitudinal center line, balanced one ahead of the other behind the aircraft's center of aerodynamic lift, and also balanced laterally relative to the two fans at the opposite side of the longitudinal center line, duct means connecting each fan with the corresponding vertical lift engine, duct means interconnecting the propulsive jet engine with each of the vertical lift engines at the corresponding side, and control vanes shiftable from a normal position wherein they block jet discharge from the propulsive engine to either vertical lift engine, to a position to supply jet discharge to either such vertical lift engine.

6. An aircraft as in claim 5, including control vanes shiftable to a position to effect jet discharge from a vertical lift engine to the propulsive engine at the corresponding side.

7. An aircraft comprising a wing, propulsive engine means to propel the wing and so to develop aerodynamic lift centered at a given center of lift, a plurality of vertical lift fans carried by the wing and arranged symmetrically about such center of lift, a separate engine means operatively connected to each fan, and each independently controlled, and means to connect a propulsive engine means to drive a lift fan, and conversely to connect a lift fan engine means for propulsion, in the event of disability of any given engine means.

8. An aircraft comprising a wing, propulsive engine means to propel the wing and so to develop aerodynamic lift centered at a given center of lift, along the aircraft's longitudinal center line and intermediate the wing's leading and trailing edges, four vertical lift fans carried by the wings and arranged two ahead of and two behind the aerodynamic center of lift, and two to port and two to starboard of that center of lift, in a pattern to produce vertical lift substantially centered at that centor of aerodynamic lift, a separate engine means operatively connected to each fan, and each independently controlled, and means to connect a propulsive engine means to drive a lift fan, or a lift engine means for propulsion, in the event of disability of any given engine means.

9. An aircraft comprising a wing having a root section intermediate opposite wing tip sections, relatively arranged to locate the center of aerodynamic lift of the wing as a whole intermediate the center of aerodynamic lift of the root section and the center of aerodynamic lift of the wing tip sections, propulsive engine means at each side of the aircraft's longitudinal center line to develop such aerodynamic lift, a plurality of vertical lift fans carried by the root section, and arranged symmetrically about the center of aerodynamic lift of the wing as a whole, a separate engine means, separately controlled, for each vertical lift fan, a nacelle structure extending forwardly and rearwardly at the junction of the root section with each wing tip section, housing engine means at the respective sides of the longitudinal center line, and projecting from the wing's surface to separate air flow over the root section from air flow over the wing tip sections, and means to connect each propulsive engine means to drive a lift fan, and conversely to connect a lift fan engine means for propulsion, in the event of disability of any given engine means.

10. An aircraft comprising a wing formed with a root section and two wing tip sections, means to propel the wing forwardly and so to develop aerodynamic lift in each such section, the aerodynamic lift of the root section being centered ahead of the combined center of aerodynamic of the two wing tip sections, and the resultant center of aerodynamic lift of the wing as a whole being located intermediate the centers of the root section and of the wing tip sections respectively, vertical lift means carried by the root section and arranged symmetrically about the center of aerodynamic lift of the wing as a whole, means to separate airflow over the root section from that over the wing tip sections, and means to regulate the lift of individual vertical lift means, for roll and pitch control, during forward propulsion, without disturbance of airflow over the wing tip sections.

References Cited in the file of this patent

UNITED STATES PATENTS

| | | |
|---|---|---|
| 2,718,364 | Crabtree | Sept. 20, 1955 |
| 2,930,544 | Howell | Mar. 29, 1960 |
| 2,936,969 | Griffith | May 17, 1960 |
| 2,939,649 | Shaw | June 7, 1960 |
| 2,982,495 | Griffith | May 2, 1961 |
| 3,080,137 | Hurel | Mar. 5, 1963 |
| 3,120,362 | Curtis | Feb. 4, 1964 |

OTHER REFERENCES

Interavia Magazine, page 1236, October 1959.

Space/Aeronautics Magazine, August 1961, pages 65–69.